(No Model.)

W. A. MADDY.
THILL COUPLING.

No. 512,982.    Patented Jan. 16, 1894.

Witnesses:
C. H. Raeder
N. F. Matthews.

Inventor
William A. Maddy.
By James J. Sheehy
Attorney

UNITED STATES PATENT OFFICE.

WILLIAM A. MADDY, OF POMEROY, OHIO.

THILL-COUPLING.

SPECIFICATION forming part of Letters Patent No. 512,982, dated January 16, 1894.

Application filed August 10, 1893. Serial No. 482,808. (No model.)

*To all whom it may concern:*

Be it known that I, WILLIAM A. MADDY, a citizen of the United States, residing at Pomeroy, in the county of Meigs and State of Ohio, have invented certain new and useful Improvements in Thill-Couplings; and I do declare the following to be a full, clear, and exact description of the invention, such as will enable others skilled in the art to which it appertains to make and use the same.

This invention has relation to an improvement in thill couplings, and it has for its prime object to reduce the cost of manufacture of such devices, and provide a coupling which will be durable and effective for the purposes designed, and which will obviate the accidental detachment of the thill and overcome the rattling in the joints, by adapting the rubber or cushion to be set up after wear and readily removed in placing the thill.

The invention will be fully understood from the following description and claim when taken in connection with the annexed drawings, in which—

Figure 1:
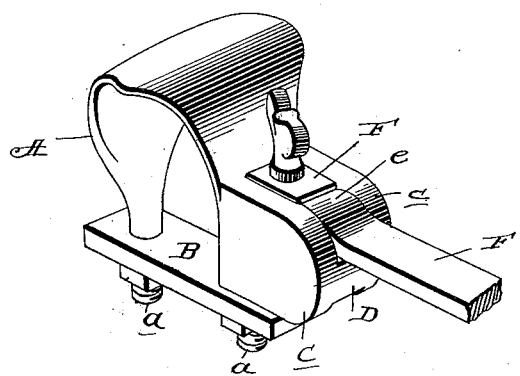
Figure 2:
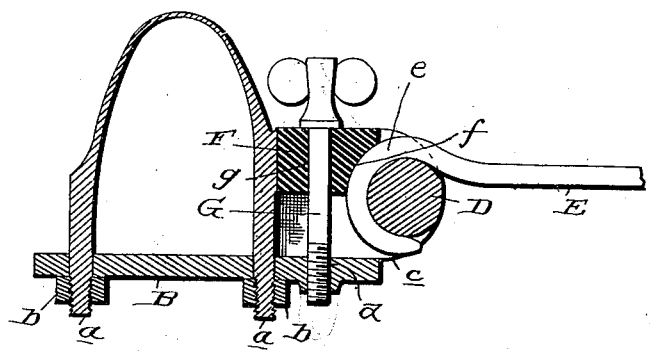

Figure 1, is a perspective view of my improved device illustrating the thill iron in position, and Fig. 2, is a longitudinal sectional view of the same.

Referring by letter to said drawings:—A, indicates the clip which is provided with the usual depending threaded branches $a$, to receive the horizontal plate B, and nuts $b$, or other suitable devices for securing the plate and clip on the axle. The clip is provided on its forward side with two parallel vertically disposed ears $c$, to receive between them the hook of the thill iron, and between these ears is an integral or fixed journal D. The plate B, which has the two holes to receive the threaded depending branches of the clip, extends a sufficient distance forwardly in a plane below the ears $c$, and is provided with a vertically-disposed, screw-tapped aperture $d$, to receive a vertical rod, as will be presently described.

E, indicates a thill iron. This iron which may be suitably attached to the end of a thill, is provided with a hook $e$, which has its free end directed slightly forwardly, as shown and is designed to take over the journal D.

F, indicates a cushion, which serves the two fold function of anti-rattler, and a means for holding the thill iron upon the journal of the clip. This rubber is of a form, substantially as shown, having its forward under side beveled at $f$, so as to correspond with the curvature of the hook of the thill iron and impinge against the same so as to confine said hook against the journal D. This rubber or other elastic substance, is arranged between the ears of the clip and is provided with a vertical hole $g$, to receive the rod or bolt G, which is provided at its upper end with a thumb piece and its lower portion is threaded to engage the threads of the aperture $d$, in the plate B. By this construction it will be seen that after wear, the rod or bolt G, may be tightened so as to hold the rubber or cushion down against the thill iron, and the construction will permit of a quick and ready removal of the thill.

It is obvious that in some cases the thumb pieces might be dispensed with on the bolt, and a head provided, in which case a nut may be placed upon the threaded end of the bolt for holding it in position. By the provision of the integral journal D, and the hook $e$, upon the thill iron to engage said journal, it will be perceived that a secure connection is effected between the iron and the clip without the employment of a nut or other device which becoming loose might cause a casual disconnection of the said thill iron from the clip.

Having described my invention, what I claim is—

The clip constructed as described, and provided with the ears and the journal between them all formed entire, in combination with the plate secured to the branches of the clip and extending in a plane below the ears and also having the aperture in said extension, as distinguishable from an open slot, the thill iron having the hook $e$, to engage the integral journal of the clip, the rubber adapted to rest horizontally between said ears and having the vertical aperture, and beveled to engage the thill iron, and the threaded bolt taking through the rubber and also through the aperture in the plate below to adjustably hold the rubber upon the thill iron, substantially as specified.

In testimony whereof I affix my signature in presence of two witnesses.

WILLIAM A. MADDY.

Witnesses:
THORNTON GREENE,
CHRISTOPHER IHLE.